(No Model.)

D. J. AMES.
APRON FASTENER FOR HARVESTERS.

No. 360,402. Patented Apr. 5, 1887.

Witnesses
Norris H. Clark
A. L. Browne

Inventor,
David Jackson Ames,
By his Attorneys, Louis Feeser & Co.

UNITED STATES PATENT OFFICE.

DAVID JACKSON AMES, OF OWATONNA, MINNESOTA.

APRON-FASTENER FOR HARVESTERS.

SPECIFICATION forming part of Letters Patent No. 360,402, dated April 5, 1887.

Application filed October 2, 1886. Serial No. 215,145. (No model.)

*To all whom it may concern:*

Be it known that I, DAVID JACKSON AMES, a citizen of the United States, residing at Owatonna, in the county of Steele and State of Minnesota, have invented an Improved Apron-Fastener for Harvesters; and I do hereby declare that the following is a full and exact description thereof, reference being had to the accompanying drawings, making part of this specification.

My invention consists in the improved coupling or fastening device for the ends of endless-apron webs set forth and claimed in the following specification.

Figure 1:
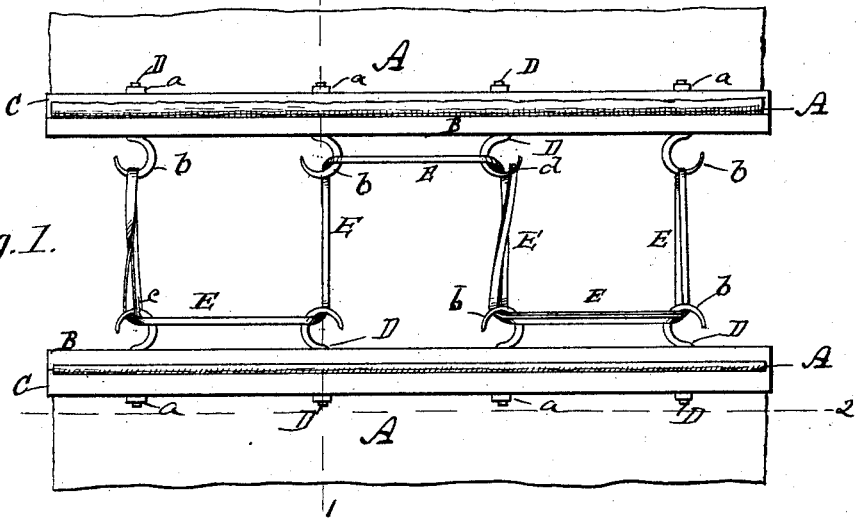
Figure 2:
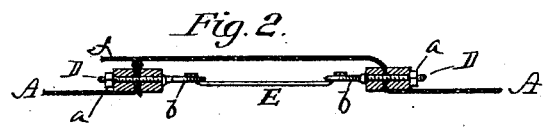
Figure 3:
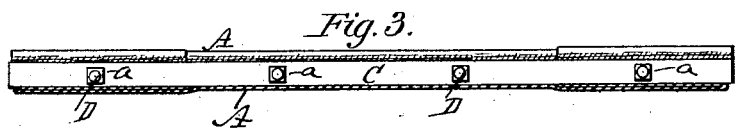
Figure 4:
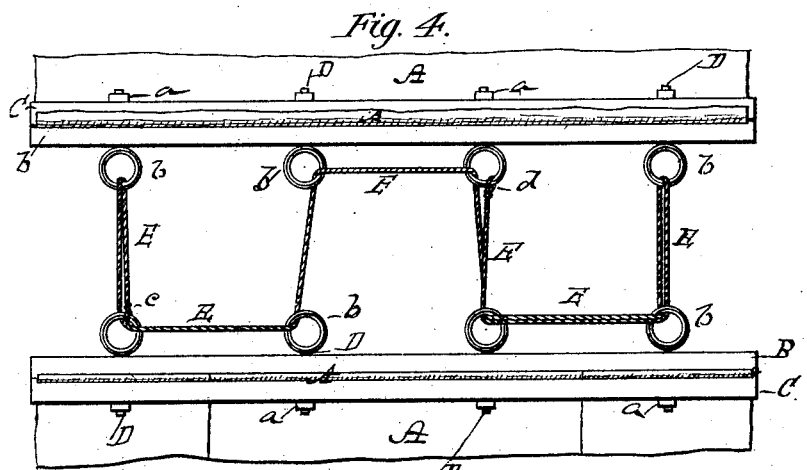

In the accompanying drawings, Figure 1 represents a top view of the two ends of an endless-apron web and of my improved coupling or connecting fastener applied thereto; Fig. 2, a vertical section of the same in a plane indicated by the line 1 1, Fig. 1; Fig. 3, a vertical section in a plane indicated by the line 2 2, Fig. 1; Fig. 4, a view corresponding with Fig. 1, but showing a modified construction of the fastener.

Like letters designate corresponding parts in all of the figures.

Each end of the canvas A is clamped between two cross-slats, B C, by means of screw-bolts D D and tightening-nuts *a a*, the bolts passing through the two slats and the canvas clamped between them. Each bolt D has a hook, *b*, on its outer end or head, and the respective bolts of the two ends of the canvas are located opposite to one another, or substantially so, whereby a lacing, E, may be passed forward and back from the bolts of one to the bolts of the other pair of slats, substantially as shown in the drawings. I prefer a leather thong for this lacing, as shown in Fig. 1, a hole or eye, *c*, being cut in one end to catch upon the end hook of one pair of slats and a similar hole or eye, *d*, in the other end to fasten upon another hook, as shown, or otherwise.

Instead of a lacing leather thong, a cord lacing may be used, as shown at Fig. 4, and this figure shows eyes *b b* on the bolts D D instead of hooks. (Shown in Fig. 1.) Eyes may well be used when a cord lacing is employed, since the cord can be readily threaded through the eyes; but for a thong lacing hooks are preferable, being more convenient for engaging and disengaging the thong. An important point in this lacing is that where the thong or cord is extended across from the hook or eye of one pair of slats to the other it should always be passed on the inner or under side of the said hooks or eyes, as shown most clearly in Fig. 2, so that as the folds of the thong or cord pass over the rollers of the endless apron the hooks or eyes do not come in contact with the rollers, and the whole fastening device runs smoothly around the same.

Whenever the canvas may require tightening up, the thong or cord may be laced more tightly in the hooks or eyes; or, especially when the canvas becomes so stretched as to bring the ends too near together, the slats at one end of the canvas are unclamped, the bolts withdrawn and again put through the canvas at a greater distance from the end thereof, and the slats again tightly clamped thereon. One end, *f*, of the canvas is or may be left free a sufficient length beyond the clamping-slats to lie over and cover the coupling, as shown in Fig. 2.

Several advantages are gained by this improved coupling and fastening for canvas aprons.

First. The canvas being tightly clamped between the slats, the strain comes equally upon the whole width thereof, and not wholly upon a few points, as when single hooks or eyes are used.

Second. The lacings passing freely and unrestrained around the hooks or eyes, the draft comes upon all equally and upon both edges of the canvas alike, so that the apron runs truly, with no tendency to run off of the rollers or too much to one side; nor does the canvas have a tendency to sway cornerwise, which, when it happens, is apt to tear away the ordinary cross-slats of the apron in going around the rollers of the same.

Third. The device is a very cheap and simple one.

Fourth. It is very easily and quickly applied to the canvas.

Fifth. It enables the retightening of the apron to be done quickly and effectually. The hook or eye bolts may be placed at any desired or suitable distance apart. Ordinarily, about six of them on each end of the canvas for a three-feet-wide apron and eight for a four-feet-wide apron will be a suitable number.

I claim as my invention—

1. In a coupling or fastener for canvas aprons, the combination of clamping-slats B C, hook or eye bolts D D, their shanks passing through the slats and belts and securing them together, and their hooks or eyes projecting in directions parallel with the plane of the canvas, and a lacing thong or cord, E, substantially as and for the purpose herein set forth.

2. The combination of the canvas A, two pairs of slats, B C, respectively clamping the ends of the canvas, screw-bolts D D, secured by nuts $a$ $a$ in the slats and provided with lacing hooks or eyes $b$ $b$ on their outer ends, and a lacing thong or cord, E, extended across from the hooks or eyes of one pair of slats to those of the other pair of slats, substantially as and for the purpose herein specified.

In testimony whereof I have hereunto set my hand in the presence of two subscribing witnesses.

DAVID JACKSON AMES.

Witnesses:
LOUIS FEESER, Jr.,
W. J. RODGERS.